United States Patent
Mizutani et al.

(10) Patent No.: US 7,045,179 B2
(45) Date of Patent: *May 16, 2006

(54) PROTECTING FILM FOR PROTECTING IMAGE AND METHOD FOR PRODUCING RECORDED MATERIAL USING THE SAME

(75) Inventors: Hajime Mizutani, Nagano (JP); Hiroyuki Onishi, Nagano (JP); Teruaki Kaieda, Nagano (JP); Masahiro Hanmura, Nagano (JP); Koichi Terao, Nagano (JP); Etsuo Okaue, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/010,824

(22) Filed: Dec. 13, 2004

(65) Prior Publication Data
US 2005/0233119 A1    Oct. 20, 2005

(30) Foreign Application Priority Data
Dec. 12, 2003  (JP)  ............................ P2003-415444

(51) Int. Cl.
*B41M 5/40*  (2006.01)

(52) U.S. Cl. .............................. 428/32.77; 428/32.87; 428/32.69; 428/32.71

(58) Field of Classification Search .................... None
See application file for complete search history.

(56) References Cited

U.S. PATENT DOCUMENTS 6,857,736 B1 *  2/2005  Onishi et al. ................ 347/105
2004/0101660 A1 *  5/2004  Kaieda et al. ............ 428/195.1

FOREIGN PATENT DOCUMENTS

JP  2000-233474  8/2000

* cited by examiner

*Primary Examiner*—Stephen Stein
*Assistant Examiner*—Timothy M. Speer
(74) *Attorney, Agent, or Firm*—Ladas & Parry LLP

(57) ABSTRACT

A protecting film for covering a recording face of a recording medium includes a support, a first protective layer formed of thermoplastic resin and formed on the support, and a second protective layer formed of thermoplastic resin, and laminated on the first protective layer. An image is formed on the recording face by a thermal transfer type overcoat process.

1 Claim, 1 Drawing Sheet

PROTECTING FILM FOR PROTECTING IMAGE AND METHOD FOR PRODUCING RECORDED MATERIAL USING THE SAME

BACKGROUND OF THE INVENTION

The present invention relates to a film for protecting an image for protecting an image formed by a recording system such as an ink jet system and a method for producing a recorded material using the same.

An ink jet system is a printing system to carry out printing by discharging droplets of ink from a minute nozzle of a recording head to adhere the same to a recording face of a recording medium such as paper. Recently, a thermal transfer type overcoat system is known in which, by using a film for protecting an image having a constitution of laminating a thermoplastic resin layer on a support, the resin layer is heated and pressure bonded on the recorded face of a recording medium on which an image has been formed by an ink jet system, subsequently the support is detached from the resin layer to provide a protective layer constituted of the resin layer, in order to improve an image fastness and the like (for example, refer to JP-A-2000-233474).

Generally, in transferring and forming a protective layer by an overcoat system treatment (overcoat system treatment includes a detaching process-free system by using a film for protecting an image with an adhesive layer in addition to the thermal transfer type having a detaching process of a support) including the thermal transfer type, it is usual to employ a process allowing a thermoplastic resin layer to transfer thermally from a support to a recording medium by using a heating and pressure bonding apparatus. However, consideration of damage of a printed ink-accepting layer with heat and degradation of a recorded image due to it gives no other choice of a limited temperature of heat and period of time that can be added by the heating and pressure bonding apparatus. Therefore, sometimes adhesiveness between a recording medium and a thermoplastic resin layer (protective layer) is not sufficient in the related method.

Further, in recent years, high speed ink absorption properties have been required for an ink jet recording medium along with speed up of printing by an ink jet system and compositional ratio of a porous inorganic particle such as amorphous silica to a binder in the ink-accepting layer thereof demonstrates an upward trend. However, surface of such the ink-accepting layer forms irregularities to give poor smoothness and adhesiveness of a thermoplastic resin layer to the surface tends to decrease significantly. This is due to the fact that sufficient melting and penetration of the thermoplastic resin layer into concave portions tends to occur difficultly.

As described above, a thermal transfer type overcoat system using a related film for protecting an image is forced to carry out thermal transfer in a mild heating condition that does not induce degradation of a recorded image by heat. Therefore, adhesiveness of a thermoplastic resin layer to a recording medium, especially to an ink jet recording medium having an ink-accepting layer containing a porous inorganic particle is quite inadequate, resulting in such a problem that a part of the resin layer is lifted from the recorded face or, in a worse case, is detached with a support during a process for detaching a support (decrease in detachability of a support). The lift of a resin layer from the recorded face becomes especially problematic when an image is formed by using a pigment ink. That is, when a pigment ink is driven into a recording face, most of coloring material (pigment) do not penetrate into a recording medium and attach to the recording face. Therefore, the lift of the resin layer induces decreasing in a image density or transferring the coloring material to the lifted resin layer side, resulting in generation of bleeding or stripping of the image.

Therefore, as a technique for achieving an excellent adhesiveness with a relatively mild heating condition that does not generate degradation of a recorded image with heat, there may be a method to lower the glass transition temperature (Tg) of a resin constituting a thermoplastic resin layer in a film for protecting an image. However, when the glass transition temperature Tg of a thermoplastic resin layer to become a protective layer by being transferred to a recording medium is lowered to an extent that can achieve the purpose, scratch resistance (abrasion resistance) of the thermoplastic resin layer decreases to generate such a problem that surface of the protective layer tends to be suffered by scratches and the like. In addition, use of a thermoplastic resin having a low glass transition temperature Tg makes the surface of the protective layer sticky at ordinary temperature to generate another problem of decrease in blocking resistance.

SUMMARY OF THE INVENTION

Accordingly, the purpose of the invention is to provide a film for protecting an image capable of allowing a thermoplastic resin layer to adhere to a recorded face of a recording medium under a relatively mild heating condition that does not induce degradation of the image, of detaching smoothly, in a subsequent detaching process of a support, only the support without lifting or stripping the resin layer from the recorded face, and of providing a high grade recording medium excellent in glossy feeling, scratch resistance, blocking resistance and the like; and to provide a method for producing a recorded material using the same.

A protecting film for covering a recording face of a recording medium, an image being formed on the recording face by a thermal transfer type overcoat process, the protecting film comprising:

a support;

a first protective layer, formed of thermoplastic resin, and formed on the support; and a second protective layer, formed of thermoplastic resin, and formed on the first protective layer.

Preferably, the thermoplastic resin forming the first protective layer has a glass transition temperature higher than that of the thermoplastic resin forming the second protective layer.

Here, it is preferably that, a difference between the glass transition temperature of the thermoplastic resin forming the first protective layer and the glass transition temperature of the thermoplastic resin forming the second protective layer is from 10 to 100° C.

Here, it is preferably that, the glass transition temperature of the thermoplastic resin forming the first protective layer is from 30 to 130° C.

Preferably, the first protective layer includes an inorganic particle.

Here, it is preferably that, a content of the inorganic particle is from 10 to 60% by weight relative to resin solid content.

Here, it is preferably that, the inorganic particle is colloidal silica.

Here, it is preferably that, the first protective layer includes a continuous phase formed of thermoplastic resin and a dispersed phase formed of thermoplastic resin dispersed in the continuous phase. The continuous phase contains the inorganic particle.

Preferably, a complex elastic modulus of the thermoplastic resin forming the second protective layer is $4.0 \times 10^8$ Pa or more at 40° C. in a temperature dispersion curve of dynamic viscoelasticity that is measured at frequency of 1 Hz, temperature rise rate of 2° C./min and minimum tension of 10 mN.

Preferably, a complex elastic modulus of the thermoplastic resin forming the second protective layer is $2.5 \times 10^5$ Pa or less at 100° C. in a temperature dispersion curve of dynamic viscoelasticity that is measured at frequency of 1 Hz, temperature rise rate of 2° C./min and minimum tension of 10 mN.

Here, it is preferably that, the glass transition temperature of the thermoplastic resin forming the second protective layer is from −20 to 60° C.

Preferably, the first protective layer includes wax.

According to the present invention, there is also provided a method for producing a recorded material by using a protecting film, comprising the steps of:

forming an image on a recording face of a recording medium;

laminating the recording medium on which the image is formed and the protecting film so that the recording face is superposed on the second protective layer of the protecting film;

applying heat and pressure to the laminated recording medium and protecting film so as to bond the recording medium and protecting film each other, wherein heating temperature at the heating and pressure bonding is equal to or greater than the glass transition temperature of the thermoplastic resin forming the second protective layer.

Preferably, the image is formed by an ink jet system.

According to the present invention, there is also provided a recorded material produced by the method for producing the recorded material.

The film for protecting an image according to the invention is intended to have a protective layer (thermoplastic resin layer) of two-layer constitution including a layer to be a surface protective layer of an imaged surface and a layer to be an adhesive layer to the imaged face, and to provide each of the layers with excellent properties corresponding to the role thereof. Therefore, the film making it possible to carry out smoothly thermal transfer processing and to give good protective properties for the imaged face. In other words, the film for protecting an image according to the invention can give, at heating and pressure bonding to a recording medium, a good adhesiveness between the protective layer (thermoplastic resin layer) and a recorded face with a low smoothness in addition to a smooth recorded face, needless to say, under a relatively mild condition such as not inducing degradation of a recorded image. On the other hand, at detaching the support, the support can be detached smoothly and finely without generating lift and the like of the thermoplastic resin layer from the recorded face. As the result, a high grade recorded material having a protective layer can be provided, which has no disarray of an image, no interfusion of an air bubble between the protective layer and the recorded face, and also is highly colored, excellent in scratch resistance and blocking resistance. Further, the film for protecting an image according to the invention can be left to stand in a state of being stacked or wound into a roll for a long period of time without generating blocking easily to give an excellent storability.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

Hereinafter, first, the film for protecting an image (hereinafter, also referred to as "protective film" simply) according to the invention will be described in detail.

Figure 1:
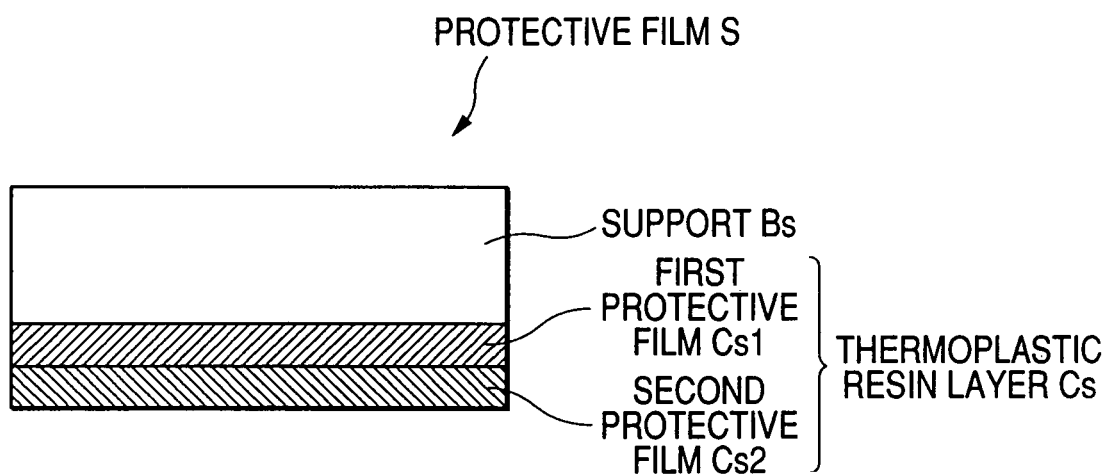
FIG. 1 is a view explaining diagrammatically a cross-section of an embodiment of the film for protecting an image according to the invention.

FIG. 1 is a view explaining diagrammatically a cross-section of one embodiment of the protective film according to the invention. A protective film S includes a support Bs and a thermoplastic resin layer Cs. The thermoplastic resin layer Cs has a first protective layer Cs1 and a second protective layer Cs2 sequentially laminated on the support Bs. The first protective layer Cs1 and the second protective layer Cs2 are thermally transferred from the support Bs to a recorded face of a recording medium while maintaining the laminated state to become a protective layer covering the recorded face so that the first protective layer Cs1 becomes the outermost layer of the protective layer. On the other hand, the support Bs is detached from the first protective layer Cs1 in the thermal transfer process and recovered.

As to the support for use in the invention, one, which is provided with heat resistance and mechanical strength capable of maintaining stably the figure under a predetermined heating and pressure bonding condition at overcoating and good detachability from the thermoplastic resin layer heated and pressure bonded to the recorded face, is used. Examples of the usable support include a sheet or film made of such material as polyethylene terephthalate (PET), biaxially oriented polypropylene (OPP), polyethylene naphthalate (PEN), polyphenyl sulfide (PPS), polyether sulfone (PES), polystyrene (PS) or polypropylene (PP).

As to thickness of the support; it is only required to set so as to give the functions and not limited in particular. However, in consideration of thermal conductivity, adhesiveness, handleability and inhibiting air bubble interfusion at overcoating, it is preferably from 8 to 60 μm, more preferably from 10 to 50 μm.

In order to improve heat resistance further, according to need, the support may also be incorporated with a ceramic fine particle, or coated on the surface thereof with a heat-resistant resin such as polyester-based resin, polyacrylic ester-based resin, polyvinyl acetate-based resin, polyurethane-based resin, styrene-acrylate-based resin, polyacrylate-based resin, polyacrylamide-based resin, polyamide-based resin, polyether-based resin, polystyrene-based resin, polyethylene-based resin, polypropylene-based resin, polyolefin-based resin, vinyl-series resin such as polyvinyl chloride resin or polyvinyl alcohol resin, cellulose-series resin such as cellulose resin, hydroxyethyl cellulose resin or cellulose acetate resin, polyvinyl acetal-series resin such as polyvinyl acetoacetal or polyvinyl butyral, silicone-modified resin or long-chain alkyl-modified resin.

Further, for the purpose of improving detachability, inhibiting attachment of dust due to a static charge, improving blocking resistance, improving design properties of the surface of the protective layer (thermoplastic resin layer) and the like, the protective layer forming surface and/or the reverse side surface of the support may also be subjected to various surface treatments such as detaching (release) treatment, antistatic treatment, corona discharge treatment and emboss treatment. The release treatment is a treatment of coating a surface to be treated with silicone resin, fluorocarbon-based resin, melamine-based resin, colloidal silica or the like as a release agent. The treatment provided on the protective layer-forming surface is effective for improving detachability (transferability) of the support, and the treatment provided on the surface reverse to the protective layer-forming surface is effective for inhibiting thermal adhesion to a heating and pressure bonding unit such as a heat roll, improving blocking resistance, bettering sliding properties during paper feeding, and the like. Thickness of the releasing layer is usually around 0.1 to 5 μm. The corona discharge treatment is a treatment in which a support (film) is run thorough a space where corona discharge exists (for example, a gap between a pair of opposing electrodes) to improve wet tension of the surface. Operating the treatment to this protective layer-forming surface can enhance adhesiveness between the support and the protective layer.

Specific preferable examples of the support include an OPP film having been subjected to a corona discharge treatment to the protective layer-forming face and a PET film having been subjected to a release treatment to the surface reverse to the protective-layer forming surface (non-protective layer-forming surface). An OPP film is excellent in blocking resistance, however, it is poor in adhesiveness to the protective layer when used as a support without modification and such a trouble may generate that the protective layer is detached from the support before a thermal transfer processing. Operation of a corona discharge treatment to the protective layer-forming surface, however, can resolve such a defect of OPP film to give a protective film taking advantage of characteristics of OPP film. In contrast to OPP film, PET film has such a trouble that it is poor in blocking resistance, therefore preference is given to one having been subjected to a release treatment to a non-protective layer-forming surface as described above.

On the other hand, the thermoplastic resin layer that is laminated on the support is constituted of a first protective layer and a second protective layer that are thermoplastic resin layers independent of each other having different compositions, respectively. Constitution of the thermoplastic resin layer includes two conformations such as a first conformation and a second conformation as described below.

[First Conformation]

The first conformation is a conformation in which a thermoplastic resin forming the first protective layer has a glass transition temperature (Tg) higher than that of a thermoplastic resin forming the second protective layer. As described above, two-layer construction of the thermoplastic resin layer and selection of the thermoplastic resin for forming the second protective layer, which is pressure bonded to a recorded face, to have a glass transition temperature Tg lower than that of the first protective layer make it possible to assure a good adhesiveness (good detachability of the support) to the recorded face because of the second protective layer, as well as to form a protective layer that is excellent in scratch resistance (abrasion resistance) and blocking resistance and hardly damaged with a scratch because of the first protective layer.

The aforesaid "glass transition temperature Tg of a thermoplastic resin forming the first protective layer or the second protective layer" means a weight average glass transition temperature Tg. That is, for example, when the first protective layer contains two kinds of thermoplastic resins having a glass transition temperature Tg of 77° C. and a glass transition temperature Tg of 50° C. respectively by a weight ratio of 3:2, the weigh average glass transition temperature Tg of the thermoplastic resin forming the first protective layer is $[(77 \times 3 + 50 \times 2)/(3+2)] = 66.2°$ C., the 66.2° C. being "the glass transition temperature Tg of the thermoplastic resin forming the first protective layer." And in this case, the Tg (weight average glass transition temperature Tg) of a thermoplastic resin forming the second protective layer is lower than 66.2° C.

Preferably difference between the glass transition temperature Tg of a thermoplastic resin forming the first protective layer and the glass transition temperature Tg of a thermoplastic resin forming the second protective layer is from 10 to 100° C., more preferably from 20 to 90° C.

The absolute value of the glass transition temperature Tg of a thermoplastic resin forming the first protective layer is, from a viewpoint of balance between scratch resistance and blocking resistance, preferably from 30 to 130° C., more preferably from 35 to 125° C.

On the other hand, the absolute value of the glass transition temperature Tg of a thermoplastic resin forming the second protective layer is, from a viewpoint of adhesiveness and film-forming properties, preferably from −20 to 60° C., more preferably from −15 to 55° C.

[Second Conformation]

The second conformation is a conformation in which the first protective layer contains an inorganic particle. The second conformation is intended to improve blocking resistance and scratch resistance by incorporating an inorganic particle in the first protective layer to become the outermost protective layer, resulting in giving the same effect as the thermoplastic resin layer in the first conformation. Incorporation of an inorganic particle to the second protective layer is not required particularly from a point of improving blocking resistance and the like, but incorporation of an inorganic particle to the second protective layer is possible according to need. In that case, content of the inorganic particle in the second protective layer is preferably less than that of the inorganic particle in the first protective layer.

Preference is given to colloidal silica as the inorganic particle. Content of the inorganic particle is preferably 10 to 60% by weight relative to resin solid content of the first protective layer. A content of the inorganic particle outside of the range may makes it difficult to bring a balance between film-forming properties, blocking resistance and color-forming properties.

In the second conformation, in addition to contain an inorganic particle, the first protective layer is preferably constituted of a continuous phase formed of a thermoplastic resin and a dispersed phase constituted of a thermoplastic resin dispersed in the continuous phase. In the constitution, the inorganic particle is contained in the continuous phase. Thus, by constituting the first protective layer with a continuous phase and a dispersed phase consisting mainly of thermoplastic resin, and further incorporating an inorganic particle in the continuous phase, when a recorded material covered with a protective layer is stored by being housed in a commercially available album or a clear file, it is possible to prevent effectively such troubles that surface of the protective layer of the recorded material sticks strongly to a cover film that is overlaid on the surface of a substance placed in the album, and that surface shape of the protective layer alters to generate change in gloss.

As for a thermoplastic resin forming the continuous phase, preference is given to a thermoplastic resin that can exert good film-forming properties at a temperature lower than that of a thermoplastic resin forming the dispersed phase, and has a glass transition temperature Tg in a range of from −50 to 60° C.

On the other hand, the dispersed phase is preferably formed with a thermoplastic resin having a glass transition temperature Tg of 60° C. or more. As for MFT, 100° C. or more is preferable.

Percentage of the dispersed phase in the first protective layer is preferably determined to 10 to 60% by weight relative to resin solid content in the first protective layer. A percentage of the dispersed phase less than 10% by weight may not prevent effectively aforementioned troubles in the case of placing a recorded material covered with the protective layer in an album or the like, and a percentage more than 60% by weight may harm film-forming properties of the continuous phase.

Further, in the second conformation, from a view point of assuring good adhesiveness to a recorded face and good detachability of the support, a thermoplastic resin forming the second protective layer has preferably a Tg of −20 to 60° C., more preferably −15 to 55° C.

Here, in the second conformation, there is no such restriction for a thermoplastic resin forming the first protective layer and the second protective layer as that existing in the first conformation. A thermoplastic resin forming the first protective layer may have a lower glass transition temperature Tg compared with a thermoplastic resin forming the second protective layer, or thermoplastic resins forming the first protective layer and the second protective layer, respectively, may have the same glass transition temperatures (Tgs). Of course, a conformation combining the first and second conformations, that is, a conformation in which a thermoplastic resin forming the first protective layer has a glass transition temperature Tg higher than that of a thermoplastic resin forming the second protective layer and the first protective layer contains an inorganic particle, is also encompassed in the invention.

The protective film according to the invention comprising the thermoplastic resin layer having such the constitution as the first or second conformation is, usually, stored in stacking many films in a cut sheet, or winding a long sheet of the film in a roll. In both storing shapes, blocking between the second protective layers or the second protective layer and the support is comprehended. Therefore, from a viewpoint of inhibiting such blocking at film storage, a thermoplastic resin whose complex elastic modulus at 40° C. obtained by a dynamic viscoelasticity measurement is $4.0 \times 10^8$ Pa or more is preferable, and $5.5 \times 10^8$ Pa or more is more preferable as a thermoplastic resin to be a second protective layer-forming material. Use of a thermoplastic resin having a complex elastic modulus within the range makes it unnecessary to conduct a special treatment for preventing blocking that was carried out conventionally, for example a release treatment of the support surface, to enhance productivity of the protective film.

On the other hand, interfusion of air bubbles between a protective layer and a recorded face makes appearance very ugly, and the air bubble existing on an image leads to decrease in image density. Therefore, from a viewpoint of inhibiting such interfusion of the air bubble, the second protective layer is formed preferably of a thermoplastic resin whose complex elastic modulus at 100° C. obtained by a dynamic viscoelasticity measurement is in a range of $2.5 \times 10^5$ Pa or less preferably, and $2.0 \times 10^5$ Pa or less more preferably.

Use of a thermoplastic resin satisfying the two ranges of complex elastic modulus (at 40° C. and 100° C.) as a second protective layer-forming material can enhance blocking resistance during film storage and air bubble interfusion inhibition properties at the same time.

In this connection, "the complex elastic modulus" in the invention is obtained as a complex elastic modulus at 40 or 100° C. of a temperature dispersion curve formed by measuring dynamic viscoelasticity using a viscoelasticity spectrometer at a temperature of 21±2° C. and a humidity of 60±5%, under nitrogen gas flow, at a frequency of 1 Hz, a temperature rise rate of 2° C./min and a minimum tension of 10 mN.

In the first and second conformations, examples of thermoplastic resins to be the first or second protective layer-forming material include polyvinyl acetal, acrylic resin, acrylic-styrene resin, acrylic-urethane resin, vinyl chloride vinyl acetate-based resin and styrene-based resin. One kind or a mixture of two or more kinds of these resins are used to adjust such characteristic values as the glass transition temperature Tg and complex elastic modulus to fall in the range.

Figure of the thermoplastic resin is not particularly limited, and a solid figure such as a pellet or an emulsion may be usable. Preference is given to using an aqueous resin emulsion formed by dispersing a thermoplastic resin particle in an aqueous liquid containing water as the principal solvent, the average particle diameter of the thermoplastic resin particle being around from 50 to 300 μm, from a viewpoint of film-forming properties and the like.

Especially, among the aqueous resin emulsions, a core-shell type resin emulsion containing a thermoplastic resin particle of a core-shell structure as a dispersoid exerts an excellent film-forming properties, and is effective as a material for forming the first and second protective layers, above all, for forming the first protective layer to be the outermost layer. The core-shell structure is a structure in which different two or more kinds of resins exist in phase separation and, usually, consisting of a core portion and a shell portion enclosing the core portion. The core-shell structure includes such figures that the shell portion covers the core portion completely, the shell portion covers a part of the core portion, a part of a resin constituting the shell portion forms a domain or the like in the core portion, and a multilayer having at least one resin layer, between the core portion and the shell portion, with a composition different from that of these. All the figures can be used suitably in the invention.

For the thermoplastic resin particle of the core-shell structure, the weight average glass transition temperature Tg of a thermoplastic resin constituting the core portion is preferably higher than the weight average Tg of a thermoplastic resin constituting the shell portion. More preferably, difference between the weight average glass transition temperatures (Tg) of both resins is 30° C. or more. Thus, a larger weight average glass transition temperature Tg of a thermoplastic resin constituting the core portion makes it possible to satisfy both of film-forming properties and blocking resistance.

The core-shell type resin emulsion can be produced by a publicly known seed emulsion polymerization method. As for a resin constituting the core portion or the shell portion, the thermoplastic resin can be preferably used. Adjustment of the glass transition temperature Tg of the core portion and shell portion can be carried out by controlling suitably kind of monomers or the like.

Further, a film-forming auxiliary agent may also be incorporated to the aqueous resin emulsion to enhance film-forming properties, allowing to form a clear protective layer without a crack and the like. Especially, as for an aqueous resin emulsion for the first protective layer to be the outermost protective layer, preference is given to using an emulsion containing a film-forming auxiliary agent. As for the film-forming auxiliary agent, one that can control the minimum film formation temperature of the aqueous resin emulsion may be usable. For example, butylcellosolve, butylcarbitol, butylcellosolve acetate, butylcarbitol acetate, diethylene glycol, hexanol, 2-ethyl hexanol, Texanol and the like can be mentioned. One kind solely or a mixture of two or more kinds of these can be used. Content of the film-forming auxiliary agent is preferably from 1 to 20% by weight, more preferably from 3 to 15% by weight relative to the resin solid content:

In order to improve further scratch resistance and blocking resistance, the first protective layer is preferably incorporated with wax. Examples of wax include paraffin wax (hydrocarbon of carbon number 20 to 40), microcrystalline wax (hydrocarbon of carbon number 30 to 60), carnauba wax (ester of fatty acid of carbon number 24 to 32 and alcohol), candelila wax (fatty acid of carbon number 32, 30 and alcohol and ester thereof), rice wax (ester of fatty acid of carbon number 16 to 32 and alcohol), Japanese wax (ester with glycerin containing also dibasic acid of carbon number 16 to 22), bees wax (ester of fatty acid of carbon number 16 to 32 and alcohol and hydrocarbon), whale wax (ester of fatty acid of carbon number 16 and alcohol), montan wax (ester of fatty acid of carbon number 20 to 32 and alcohol and resin base), ozokerite (hydrocarbon), ceresin (whitely purified ozokerite), polyethylene wax, Fischer tropush wax (hydrocarbon of carbon number 17 to 78), amide wax (fatty acid amide or bisamide), hardened caster oil (castor wax, ester of 12-hydroxy stearic acid and glycerin), synthetic wax containing ester of monovalent alcohol and fatty acid as the principal component, Gerbe wax (ester) obtained from reaction of branched higher alcohol and fatty acid through Gerbe reaction and the like. One kind or a combination of two or more kinds of these can be used. Examples of the suitable commercially available wax include Nopco 1245-M-SN and Nopcoat PEM-17 from SAN NOPCO Limited, Chemipearl series WF-640, W-700, W-200 from Mitsui Chemicals, Inc. and the like. Content of the wax is preferably from 1 to 10% by weight, more preferably from 2 to 9% by weight relative to the resin solid content.

To the first and second protective layers, according to need, various additives such as a ultraviolet absorber, a light stabilizer, an oxidation inhibitor, a water resistant agent, an antiseptic agent, a surfactant, a thickener, a flow improver, a pH adjuster, a leveling agent and an antistatic agent may also be added. These additives can be added to either one of the two layers or to both of them.

The total thickness of the thermoplastic resin layers (first and second protective layers) is preferably 2 to 50 μm, in particular from 3 to 30 μm, and above all 5 to 30 μm. A thickness of less than 2 μm might not give a sufficient image protection effect, and that more than 50 μm might decrease transparency. The thickness of respective layers may be adjusted suitably to make the total thickness of the thermoplastic resin layers fall in the range while considering degree of irregularities of the recorded face and image quality (translucent feeling, glossy feeling and the like). Although not restricted particularly, preferably the thickness of the first protective layer is from 1 to 28 μm, and that of the second protective layer is from 2 to 29 μm.

When producing the protective film S as shown in FIG. 1, first, each of coating liquids (aqueous resin emulsion) for the first protective layer Cs1 and the second protective layer Cs2 is prepared. Then, on the support Bs having been subjected arbitrarily to necessary treatments such as a release treatment, the coating liquid for the first protective layer Cs1 is coated and dried and, subsequently, the coating liquid for the second protective layer Cs2 is coated and dried to produce the protective film S. Coating of the coating liquid can be carried out with various coating methods such as a roll coating method, a rod bar coating method or an air knife coating method.

Next, the production method for the recorded material according to the invention employing the film for protecting an image will be described on the basis of a preferable embodiment employing the protective film S as shown in FIG. 1.

The method for producing a recorded material (hereinafter, also referred to as "production method" simply) according to the embodiment comprises an image formation process for forming an image by driving an ink to a recording face of a recording medium with an ink jet system, and an overcoating process including heating and pressure bonding the protective film S to the recording face having been formed of the image via a thermoplastic resin layer Cs and, subsequently, detaching the support Bs.

The recording medium for use in the production method according to the invention is only required to be capable of a ink jet recording and includes, for example, high-quality paper, recycled paper, copying paper, bond paper, ink jet recording paper, art paper, coated paper, cast-coated paper, resin-coated paper, baryta-coated paper, board paper, Japan paper, nonwoven cloth; resin films made of polyethylene, polypropylene polystyrene, polyethylene terephthalate and the like. In particular, the ink jet recording paper is most appropriate and preferable for a ink jet recording because, combined with the protective layer according to the invention, it allows to make a recorded material of a high image quality and high grade and a high storability comparable with silver halide photography. The protective film according to the invention can form a protective layer excellent in adhesiveness even to the surface of the ink jet recording paper that is poor, usually, in surface smoothness.

The ink jet recording paper has a constitution of providing an ink-accepting layer containing an inorganic particle on a base material. Examples of the base material include plastic film made of polyethylene, polypropylene, polyethylene terephthalate and the like, and sheet made of paper material such as bond paper, coated paper and laminated paper.

As the inorganic particle, for example, a porous inorganic particle such as porous amorphous silica, porous amorphous alumina or porous amorphous magnesium carbonate is used preferably. Content of the inorganic particle is preferably 30 to 90% by weight in terms of a solid content in the ink-accepting layer.

In the ink-accepting layer, a water-soluble polymer such as polyvinyl alcohol, vinyl acetate or acrylic, or an emulsion is contained as a binder for the inorganic particle. Content of the binder is preferably 5 to 60 weight parts relative to 100 weight parts of the porous inorganic particle. Further, the ink-accepting layer may be incorporated with one kind or two or more kinds of various additives such as a dye-fixing agent, fluorescent brightener, fungicide, antiseptic agent, surfactant, thickener, pH adjuster, antifoaming agent, hardening agent, leveling agent and ultraviolet absorber according to need.

The ink-accepting layer may be formed by coating a coating liquid containing an inorganic particle, binder and the like on a base material with various methods such as a roll coating method, a rod bar coating method or an air knife coating method. The thickness of the ink-accepting layer in this case is preferably from 10 to 60 μm from a viewpoint of ink absorption properties and prevention of powder falling and the like. Further, material feeling, feeling and the like of the ink-accepting layer are not particularly restricted and may be of mat-tone, high-glossy tone such as being subjected to mirror-gloss-finishing by a casting method or semi-glossy tone.

The ink for use in the production method according to the invention is only required to be an ink for an ink jet recording, and either a dye ink or a pigment ink may be usable. An ink for an ink jet recording is generally formed by adding a colorant such as dye or pigment to water, and is usually incorporated further with various organic solvents or surfactant in order to retain humidity, adjust penetration, or the like. In particular, a pigment ink excels in light stability, water resistance and the like compared with a dye ink to allow a recorded material excelling in long term storability to be formed by an synergistic effect of the protective film according to the invention, and is preferable. When forming a colored image, three inks of elementary colors of subtractive color mixing, that is, yellow, magenta and cyan, or inks of four or more colors including additionally black and other colored inks are used.

Figure 2:
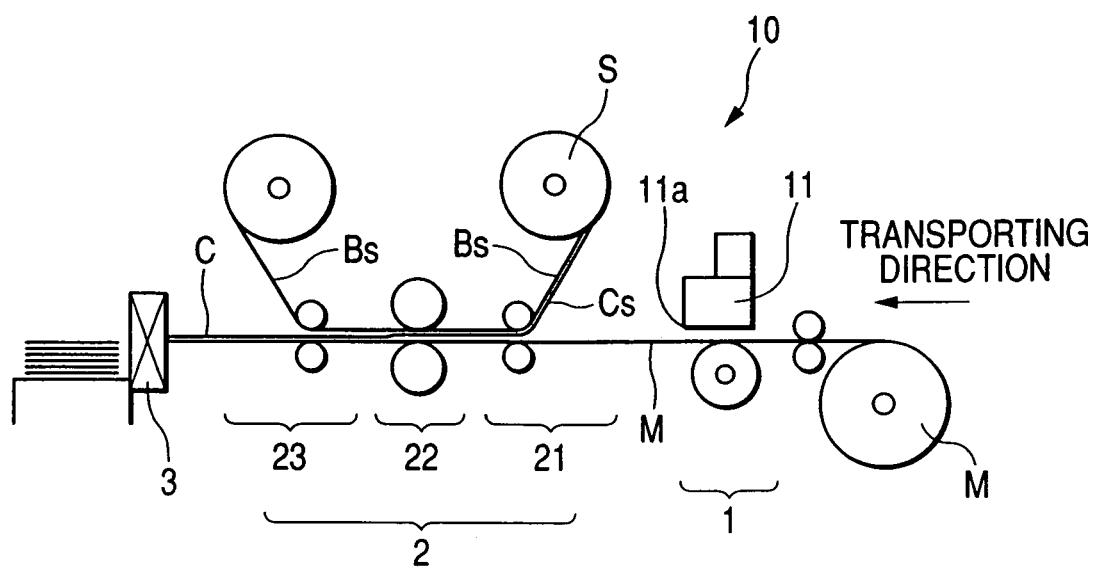
FIG. 2 is a side view showing schematically an embodiment of a production apparatus for use in practicing the production method according to the invention.

FIG. 2 is a side view showing schematically a substantial part of a production apparatus for use in practicing the production method. The production apparatus 10 has such a constitution that a thermal-transfer mechanism is mounted following a recording head of an ink jet printer being compatible with a roll paper, and is provided with an ink jet recording section 1 used in the image formation process and an overcoating section 2 used in the overcoating process. A cutter 3 is provided near a paper ejection section to make it possible to eject a continuous sheet (long sheet) after cutting it into a desired length. Constitution of respective sections of the production apparatus 10 is substantially the same as that in a publicly known inkjet printer and a thermal-transfer mechanism.

The ink jet recording section 1 is provided with a recording head 11 that is scanned bi-directionally in the vertical direction to a transporting direction of a recording medium M to drive inks of respective colors from jet nozzle openings of a nozzle opening plane 11a to the recording face of the recording medium M in a state of being wound in a roll on the basis of input image information. By repeating transporting of the recording medium M and bi-directional scanning of the recording head 11, a desired image is formed on the recording face.

The recording head 11 may employ either a continuous system in which an ink is discharged continuously at certain time intervals and the discharged ink droplet is deflected to complete an image, or an on-demand system in which an ink is discharged corresponding to image data. But, from a view point of capability of a fine drive control and a little volume of waste fluid, an on-demand system is preferable. As for an ink discharge system, there are such systems that an ink is discharged by using an electricity-machine converter such as a piezoelectric element, and that an ink is discharged by heating it with an electricity-heat converter such as a heat-generating element having a heat-generating resistive element. And the system is not restricted particularly in the invention.

The overcoating section 2 includes a supply member 21 for supplying the protective film S on the recorded face of the recording medium M, a heating and pressure bonding member 22 for heating and pressure bonding the thermoplastic resin layer Cs (first protective layer Cs1 and second protective layer Cs2) of the protective film S to the recording face having been formed of an image, and a detaching member 23 for detaching the support Bs from the thermoplastic resin layer Cs having been heated and pressure bonded.

The supply member 21 is provided with the protective film S, a supply roll that winds the protective film S and constitutes a rotation center during film supply, a pressurizing roll for pressurizing the run out protective film S onto the recording medium M, and the like.

The heating and pressure bonding member 22 is provided with a pair of rolls housing a heater (heat roll). Distance between both rolls is intended to be settable and adjustable arbitrarily, making it possible to conduct a heating and pressure bonding treatment for a sheet-like material running through between the pair of rolls. The heating and pressure bonding member is only required such that it can conduct a heating and pressure bonding treatment for a sheet-shaped material, and may be a thermal head, a pressing iron, a commercially available laminator, and the like.

The detaching member 23 is provided with a pressing roll, a winding roll for winding the support Bs, and the like.

At the overcoating section 2 having such the constitution, the overcoating process proceeds as follows. First, to the recording face of the recording medium M, on which an image has been formed by the ink jet recording section 1, the protective film S is supplied by the supply member 21 so that the recorded face and the second protective layer Cs2 face with each other, and stacked to form a laminate.

Subsequently, the laminate is pressurized under heating (heating and pressure bonding treatment) by running through a nipping part between the pair of rolls of the heating and pressure bonding member 22. Heating temperature at this time is determined such that it is higher than the glass transition temperature Tg of a thermoplastic resin forming the second protective layer Cs2. The heating temperature is lower compared with a heating temperature when an conventional protective film of a single-layer structure is used.

Due to the heating and pressure bonding treatment, the resin of the second protective layer Cs2 contacting to the recorded face melts to partake fluidity and fits in irregularities of the recorded face to result in exerting a sufficient adhesive force. Thus, the thermoplastic resin layer Cs is pressure bonded to the recorded face with a good adhesiveness to form the protective layer C. On the other hand, since the heating condition (heating temperature, heating time) at the heating and pressure bonding treatment is a mild one that does not lead to degradation of a recorded image, there is no possibility for leading to a disadvantage such as discoloration of the recorded image. Subsequently, when the temperature of the laminate falls off, the support Bs is detached by the detaching member 23. At this time, since the thermoplastic resin layer Cs (protective layer C) adheres tightly to the recorded face, there is no lift or stripping of the thermoplastic resin layer Cs from the recorded face along with detaching the support Bs to give a recorded material having a protective layer without disarray of an image.

The protective film according to the invention is only required to be one constituted by laminating a first protective layer and a second protective layer made of thermoplastic resin on a support sequentially, and various modifications are possible in a range not departing from the aspect of the invention.

EXAMPLES

Hereinafter, by citing Examples of the invention and Test examples exhibiting advantage of the invention, the invention will be explained more specifically, however, these Examples place no restriction on the invention.

(Production of a Protective Film)

Protective films 1 to 23 were produced by coating respective coating liquids (aqueous resin emulsion) for a thermoplastic resin layer incorporated with various forming materials on the whole surface of either side of following supports 1 to 4 uniformly in a predetermined coating volume by using a wire bar and drying the same to form a thermoplastic resin layer. Constitution of the thermoplastic resin layer in respective protective films is listed in following Tables 1 and 2.

Support 1: PET film ("PET Lumilar S10" from PANAC, 38 μm in thickness)

Support 2: OPP film having been subjected to corona discharge treatment to a thermoplastic resin layer forming surface ("OPU-1" from TOHCELLO CO,. LTD, 20 μm in thickness)

Support 3: PET film having been subjected to release treatment (coated with silicone-based resin) to surface opposing to a thermoplastic resin layer forming surface ("SP-PET-03-50BU" from PANAC, 50 μm in thickness)

Support 4: PET film having been subjected to release treatment (coated with melamine-based resin) to surface opposing to a thermoplastic resin layer forming surface ("PET-38SG-1" from PANAC, 38 μm in thickness)

TABLE 1

| Protective film No. | First protective layer | | | | | Second protective layer | | | | |
|---|---|---|---|---|---|---|---|---|---|---|
| | Thermoplastic resin | Weight average Tg | Film-forming auxiliary agent | Wax | Thickness | Thermoplastic resin | Weight average Tg | Complex elastic modulus (40° C.) | Complex elastic modulus (100° C.) | Thickness |
| 1 | Boncoat 9404 | 40° C. | — | — | 5 μm | Boncoat EC-819 | 11° C. | $2.1 \times 10^7$ Pa | $1.9 \times 10^5$ Pa | 15 μm |
| 2 | ACRIT WEM-030U core-shell type | 66.2° C. | — | — | 5 μm | Boncoat EC-819 | 11° C. | $2.1 \times 10^7$ Pa | $1.9 \times 10^5$ Pa | 15 μm |
| 3 | ACRIT WEM-030U core-shell type | 66.2° C. | To resin solid content 5 wt % | — | 5 μm | Boncoat EC-819 | 11° C. | $2.1 \times 10^7$ Pa | $1.9 \times 10^5$ Pa | 15 μm |
| 4 | ACRIT WEM-030U (core-shell type) | 66.2° C. | — | To resin solid content 3 wt % | 5 μm | Boncoat EC-819 | 11° C. | $2.1 \times 10^7$ Pa | $1.9 \times 10^5$ Pa | 15 μm |
| 5 | ACRIT WEM-030U (core-shell type) | 66.2° C. | To resin solid content 5 wt % | To resin solid content 3 wt % | 5 μm | Boncoat EC-819 | 11° C. | $2.1 \times 10^7$ Pa | $1.9 \times 10^5$ Pa | 15 μm |
| 6 | ACRIT WEM-030U (core-shell type) | 66.2° C. | To resin solid content 5 wt % | To resin solid content 3 wt % | 5 μm | ACRIT WEM-202U (core-shell type) | 20.8° C. | $5.3 \times 10^7$ Pa | $2.3 \times 10^5$ Pa | 15 μm |
| 7 | ACRIT WEM-030U (core-shell type) | 66.2° C. | To resin solid content 5 wt % | To resin solid content 3 wt % | 5 μm | Boncoat 9404/ EC-819 (weight ratio 1/3) | 24° C. | $6.1 \times 10^7$ Pa | $2.5 \times 10^5$ Pa | 15 μm |
| 8 | Boncoat 9404 | 40° C. | To resin solid content 5 wt % | To resin solid content 3 wt % | 5 μm | ACRIT WEM-030U (core-shell type) | 66.2° C. | $4.5 \times 10^8$ Pa | $8.4 \times 10^5$ Pa | 15 μm |
| 9 | Boncoat 9404 | 40° C. | To resin solid content 5 wt % | To resin solid content 3 wt % | 5 μm | ACRIT WEM-030U/ 202U (weight ratio 1/1) | 41° C. | $3.2 \times 10^8$ Pa | $2.7 \times 10^5$ Pa | 15 μm |
| 10 | Boncoat 9404 | 40° C. | — | — | 20 μm | — | — | — | — | — |
| 11 | Boncoat 9404 | 40° C. | — | — | 5 μm | ACRIT 3042MA | 105° C. | $7.5 \times 10^8$ Pa | $6.3 \times 10^6$ Pa | 15 μm |

TABLE 2

| Pro- | First protective layer | | | | | | Second protective layer | | | | |
|---|---|---|---|---|---|---|---|---|---|---|---|
| tec-tive film No. | Thermoplastic resin | Weight average Tg | In-organic particle | Film-forming auxiliary agent | Wax | Thick-ness | Thermoplastic resin | Weight average Tg | In-organic particle | Film-forming auxiliary agent | Thick-ness |
| 12 | Boncoat EC-819 | 11° C. | P-73 30 wt % | To resin solid content 5 wt % | — | 5 μm | Boncoat EC-819 | 11° C. | — | — | 15 μm |
| 13 | Boncoat EC-819 | 11° C. | P-78D 30 wt % | To resin solid content 5 wt % | — | 5 μm | Boncoat EC-819 | 11° C. | P78-D 5 wt % | — | 15 μm |
| 14 | Boncoat EC-819 | 11° C. | ST-30 5 wt % | To resin solid content 5 wt % | — | 6 μm | Boncoat EC-819 | 11° C. | — | — | 15 μm |
| 15 | Boncoat EC-819 | 11° C. | ST-30 30 wt % | To resin solid content 5 wt % | To resin solid content 3 wt % | 5 μm | ACRIT WEM-202U (core-shell type) | 20.8° C. | — | — | 15 μm |
| 16 | Boncoat EC-819 | 11° C. | ST-30 70 wt % | To resin solid content 5 wt % | — | 5 μm | Boncoat EC-819 | 11° C. | — | — | 15 μm |
| 17 | ACRIT WEM-030U (core-shell type) | 66.2° C. | ST-30 10 wt % | To resin solid content 5 wt % | To resin solid content 3 wt % | 5 μm | Boncoat EC-819 | 11° C. | — | — | 15 μm |
| 18 | Movinyl 8030 | 17° C. | — | — | To resin solid content 3 wt % | 4 μm | Movinyl 727 | 30° C. | — | To resin solid content 3 wt % | 5 μm |
| 19 | Movinyl 8030 | 17° C. | ST-30 10 wt % | — | To resin solid content 3 wt % | 4 μm | Movinyl 727 | 30° C. | — | To resin solid content 3 wt % | 5 μm |
| 20 | Movinyl 8030 | 17° C. | — | — | To resin solid content 5 wt % | 4 μm | Movinyl 870 | 30° C. | — | To resin solid content 3 wt % | 5 μm |
| 21 | Movinyl 8030 | 17° C. | — | — | To resin solid content 3 wt % | 4 μm | Movinyl 727 | 30° C. | — | To resin solid content 3 wt % | 5 μm |
| 22 | Movinyl 8030 | 17° C. | ST-30 10 wt % | — | To resin solid content 3 wt % | 4 μm | Movinyl 727 | 30° C. | — | To resin solid content 3 wt % | 5 μm |
| 23 | 1) Movinyl 8020 Movinyl 790 | 27.6° C. | ST-30 17 wt % | — | To resin solid content 3 wt % | 4 μm | Movinyl 727 | 30° C. | — | To resin solid content 3 wt % | 5 μm |

Note 1)
Constitution is such that a continuous phase is formed of Movinyl 8020, and that Movinyl 790 is dispersed in the continuous phase as a dispersed phase.

Content ratio of respective resin components is Movinyl 8020: Movinyl 790=3:2 (weight ratio).

Details of respective thermoplastic resins listed in Tables 1 and 2 are as follows:

"Boncoat 9404" an acrylic resin emulsion from DAINIPPON INK AND CHEMICALS, INC.;

"Boncoat EC-819" an acrylic resin emulsion from DAINIPPON INK AND CHEMICALS, INC.;

"ACRIT WEM-030U" an acrylic resin emulsion from Taisei Kako K.K., core portion Tg is 77° C., shell portion Tg is 40° C., core portion/shell portion weight ratio=60/40;

"ACRIT WEM-202U" an acrylic resin emulsion from Taisei Kako K.K., core portion Tg is 8° C., shell portion Tg is 40° C., core portion/shell portion weight ratio=60/40;

"ACRIT 34042MA" an acrylic resin emulsion from Taisei Kako K.K.;

"Movynil 8030" a colloidal silica complex acrylic resin emulsion from CLARIANT POLYMERS K.K.;

"Movynil 727" an acrylic resin emulsion from CLARIANT POLYMERS K.K.;

"Movynil 870" an acrylic-styrene resin emulsion from CLARIANT POLYMERS K.K.;

"Movynil 8020" a colloidal silica complex acrylic resin emulsion from CLARIANT POLYMERS K.K., Tg is −22° C., MFT is less than 0° C.;

"Movynil 790" an acrylic resin emulsion from CLARIANT POLYMERS K.K., Tg is 102° C., MFT is 220° C.

A film-forming auxiliary agent used for both of the first and second protective layers was Texanol. As for wax, a wax emulsion "Sanleaf CLA-3" from Sanyo Chemical Industries, LTD. was used for protective films 18 to 22, and "Chemipearl WF-640" from Mitsui Chemicals was used for other protective films.

Details of the inorganic particles listed in Table 2 are as follows, respectively:

"P-73" gel-type silica from MIZUSAWA INDUSTRIAL CHEMICALS, LTD. (trade name "MIZUKASIL"), particle diameter is 2.5 μm; "P-78D" gel-type silica from MIZUSAWA INDUSTRIAL CHEMICALS, LTD. (trade name "MIZUKASIL"), particle diameter is 8.0 μm; "ST-30" colloidal silica from NISSAN CHEMICAL INDUSTRIES, LTD. (trade name "Snowtex"), particle diameter is 16 nm.

The complex elastic modulus shown in the Table 1 is a complex elastic modulus obtained by measuring dynamic viscoelasticity using a non-resonance forced extension vibration type DMS6100 from SEIKO INSTRUMENTS Co., Ltd. as a viscoelasticity spectrometer at temperature of 21±2° C., humidity of 60±5%, under an atmosphere of nitrogen gas flow, at frequency of 1 Hz, at temperature rise rate of 2° C./min and minimum tension of 10 mN to form a temperature dispersion curve thereof, and selecting a value at 40° C. and 100° C. thereof. Here, when measuring dynamic viscoelasticity, an emulsion of resin to be measured was coated on a biaxially oriented polypropylene (OPP) resin film, dried at 100° C. for 2 minutes, then left to stand overnight to form a coating film of the resin on the OPP resin film, and the coating film was used as a sample for measurement.

For the protective films 1 to 23, blocking resistance (storability) during film storage was evaluated by the following method. The result is listed in Table 3 below.

<Blocking Resistance (Storability) During Film Storage>

For each of the protective films, two A-4 size sheets were prepared. The two sheets were superposed in such a manner that the thermoplastic resin layer of one of them faced to the support of the other, which was left to stand under the condition of a room temperature of 50° C. and relative humidity of 0% in a state of applying load of 300 g/cm2 from above for 24 hours. Subsequently, the superposed two layers were detached at a detaching angle (an angle formed between the facing thermoplastic resin layer and support) of 130 degrees and a detaching speed of 30 cm/min to evaluate based on the following evaluation standard by observing the state of superposed surfaces with eyes.

Evaluation Standard
A: no transfer of the thermoplastic resin layer to the support is observed. No blocking generates even in a long term storage. Good storability.
B: a part of the thermoplastic resin layer has transferred to the support. However, no problem for practical use.
C: a bit of transfer of the thermoplastic resin layer to the support can be distinguishable. Limit for practical use.
D: most parts of the thermoplastic resin layer have been transferred to the support. Not effective for practical use.

(Production of a Recorded Material)

By using an ink jet printer ("MC2000" from SEIKO EPSON CORPORATION), a recorded material was produced by printing each of six colors of aqueous pigment inks including yellow, magenta, cyan, light magenta, light cyan and black to the recording face of a recording medium ("Photographic Paper (glossy)" from SEIKO EPSON CORPORATION) by a driving amount of 3.5 mg/cm2.

(Production of Heated and Pressure Bonded Material)

The protective film was superposed on the printed face of the recorded material in such a way that the thermoplastic resin layer faced to the printed face and laminated, which was subjected to a pressure bonding treatment (line pressure of 5.0 kN/cm2, refer to following Table 3 as for heating temperature) by allowing it to run through between a pair of heat rolls. Thus, heated and pressure bonded material formed of the recorded material and any of the protective films 1 to 23 to give samples for Example 1 to 22 and Comparative examples 1 to 2, respectively.

Respective samples (heated and pressure bonded material of the recorded material and the protective film) for Examples 1 to 22 and Comparative examples 1 to 2 were evaluated for detachability according to the following method. In addition, the recorded material with the protective layer obtained by detaching the support from the respective samples were evaluated for appearance, scratch resistance, blocking resistance and album storability according to the following methods, respectively. These results are shown in Table 3 below.

<Evaluation Method of Detachability>

Only the support was detached from each of the samples (heated and pressure bonded material of the recorded material and the protective film) to give a recorded material with the protective layer. The detaching angle (an angle formed between the support and the recorded material) was 180 degrees and detaching speed was 100 cm/min. Behavior at the detaching and the surface of the protective layer of the recorded material were observed with eyes to evaluate on the basis of the following evaluation standard.

Evaluation Standard
A: lift of the thermoplastic resin layer from the printed surface of the recorded material does not occur during detaching the support, resulting in no bleeding and stripping of an image. Good detachability.
B: lift of the thermoplastic resin layer from the printed surface is observed in a part during detaching the support and bleeding or stripping of an image is slightly observed. However, no problem in practical use.
C: lift of the thermoplastic resin layer from the printed surface is observed in considerable parts during detaching the support and a part of the image transfers to the support. Bleeding and peeling are severe. Can not be used practically.

<Evaluation Method of Appearance>

The protective layer of the recorded material with the protective layer was observed with eyes and determined such that a sample with clear feeling and without interfusion of the air bubble and crack was A (good appearance), a sample with a little meager clear feeling or a little interfusion of air bubbles or very small cracks was B (no problem in practical use), and that a sample with much degraded clear feeling or definite observation of air bubbles or highly visible cracks was C (not effective for practical use).

<Evaluation Method of Scratch Resistance>

The surface of the protective layer of the recorded material with the protective layer was observed with eyes after it was slightly rubbed with backside of the Photographic Paper <glossy> to determine such that a sample free from a scratch was A (good scratch resistance), and that a sample with scratches on the surface was B (no problem in practical use).

<Evaluation Method of Blocking Resistance>

Two A-4 size sheets of the recorded material with the protective layer were prepared, which were superpose such that front side of one of them (front side of the protective layer) faced to back side of the other (back side of MC Photographic Paper) and left to stand under a condition of a room temperature of 50° C. and relative humidity of 60% in a state of applying load of 300 g/cm2 from above for 24 hours. Subsequently, the superposed two sheets were detached at a detaching angle (an angle formed between the opposing protective layer and recorded material) of 130 degrees and a detaching speed of 30 cm/min. Then, the state of superposed faces was observed with eyes to evaluate on the basis of the following evaluation standard.

C: almost whole surface of the protective layer has stuck to the cover film upon taking out the recorded material from album, and gloss change is heavy compared with the state before the material was housed in the album. Not effective for practical use.

TABLE 3

| | | | | Heating temperature | | Recorded material with protective film | | | |
|---|---|---|---|---|---|---|---|---|---|
| | Support No. | Protective film No. | Storability | at pressure bonding (° C.) | Detachability | Appearance | Scratch resistance | Blocking resistance | Alubam storability |
| Example 1 | 1 | 1 | C | 40 | A | A | B | B | C |
| Example 2 | 1 | 2 | C | 40 | A | B | B | A | A |
| Example 3 | 1 | 3 | C | 40 | A | A | B | A | A |
| Example 4 | 1 | 4 | C | 40 | A | B | A | A | A |
| Example 5 | 1 | 5 | C | 40 | A | A | A | A | A |
| Example 6 | 1 | & | B | 40 | A | A | A | A | A |
| Example 7 | 1 | 7 | B | 40 | A | A | A | A | A |
| Example 8 | 1 | 8 | A | 40 | A | B | A | A | B |
| Example 9 | 1 | 9 | B | 40 | A | A | A | A | B |
| Example 10 | 1 | 11 | A | 110 | B | B | B | B | C |
| Example 11 | 1 | 12 | C | 40 | A | B | A | A | B |
| Example 12 | 1 | 13 | B | 40 | A | B | A | A | B |
| Example 13 | 1 | 14 | C | 40 | A | A | B | B | C |
| Example 14 | 1 | 15 | B | 40 | A | A | A | A | B |
| Example 15 | 1 | 16 | C | 40 | A | B | B | A | B |
| Example 16 | 1 | 17 | C | 40 | A | A | A | A | A |
| Example 17 | 2 | 18 | A | 100 | A | A | A | A | B |
| Example 18 | 2 | 19 | A | 95 | A | A | A | A | B |
| Example 19 | 2 | 20 | A | 90 | A | A | A | A | B |
| Example 20 | 3 | 21 | A | 100 | A | A | A | A | B |
| Example 21 | 4 | 22 | A | 110 | A | A | A | A | B |
| Example 22 | 4 | 23 | A | 100 | A | A | A | A | A |
| Comparative example 1 | 1 | 10 | B | 50 | C | C | B | B | C |
| Comparative example 2 | 1 | 1 | C | No heating | C | C | B | C | C |

Evaluation Standard

A: no transfer of the protective layer to the back side is observed. Good blocking resistance.
B: a part of the protective layer has transferred to the back side. However, no problem in practical use.
C: most parts of the protective layer have transferred to the back side. Not effective for practical use.

<Evaluation Method of Album Storability>

The recorded material with the protective layer was housed in a free album from KOKUYO Co., Ltd. according to an ordinary method (housed by interleaving it between a cover film and mount), and the album was left to stand under a circumstance of a room temperature of 60° C. and a humidity of 60% RH for 24 hours. Subsequently, the recorded material was taken out of the album, and condition at that time and surface of the protective layer of the taken out recorded material were observed with eyes to evaluate on the basis of the following evaluation standard.

Evaluation Standard

A: almost no sticking between the cover film and surface of the protective layer is observed upon taking out the recorded material from the album, and no change in the state of the protective layer exists compared with the state before the material was housed in the album. Good album storability.
B: a part of surface of the protective layer has stuck to the cover film upon taking out the recorded material from the album, but it can be stripped easily and gloss change is slight compared with the state before the material was housed in the album. No problem in practical use.

Although the invention has been illustrated and described for the particular preferred embodiments, it is apparent to a person skilled in the art that various changes and modifications can be made on the basis of the teachings of the invention. It is apparent that such changes and modifications are within the spirit, scope, and intention of the invention as defined by the appended claims.

The present application is based on Japan Patent Application No. 2003-415444 filed on Dec. 12, 2003, the contents of which are incorporated herein for reference.

What is claimed is:

1. A protecting film for covering a recording face of a recording medium, an image being formed on the recording face, the protecting film comprising:

a support;
a first protective layer, formed of thermoplastic resin, and formed on the support; and
a second protective layer, formed of thermoplastic resin, and formed on the first protective layer, wherein the first protective layer includes a continuous phase formed of thermoplastic resin and a dispersed phase formed of thermoplastic resin dispersed in the continuous phase; and
wherein the continuous phase contains the inorganic particle.

* * * * *